2,937,104

POLYMERIC ALKYLENE-OXIDE DEFOAMER MATERIAL FOR ALKALINE AQUEOUS ADHESIVE SOLUTIONS AND THE LIKE

John Thomas Stephan, Seattle, Wash.

No Drawing. Application August 18, 1958
Serial No. 755,432

19 Claims. (Cl. 106—154)

This invention relates to an improvement in the control of foam in aqueous alkaline protein, starch, or synthetic resin adhesive solutions, or combinations thereof, and the like.

Particularly this invention is an improvement in the art of defoaming alkaline adhesive solutions such as are used in the gluing of wood, the sizing of paper or textiles, the coating of paper, as agricultural spray stickers, and the like by a polyglycol which is soluble in ethylene glycol, only to the extent of not over 10 parts of polyglycol to 90 parts of ethylene glycol, i.e. homopolymers of alkylene-oxides having at least three carbon atoms, or co-polymers of at least 2 different alkylene-oxides, or mixtures of such polymers, wherein the polyglycol has an average molecular weight of at least about 500.

The copolymers of ethylene-oxide with higher alkylene-oxides and propylene-oxide with butylene-oxide may have a more or less random or hetero distribution of the different oxide groupings along the polymer chain or they may be block polymers wherein a substantial portion of the polymer chain consists of one alkylene-oxide interspersed with blocks of another alkylene-oxide.

It is well known that alkaline aqueous protein solutions and the like show a marked tendency to foam when agitated or when air or gas is introduced beneath the liquid surface. There are many examples of the use of such solutions where control of foaming is essential to the success of the operation. The control of foam is particularly important in the coating of paper, the gluing of wood or paper, and the use of protein binders in agricultural sprays. Soybean flour is used in these applications and others because of its cheapness and special properties. The soybean flour of commerce is one which has had the soybean oil extracted from it by solvent extraction. Such extracted soybean flour is particularly prone to foam and a considerable technology has developed in attempting to economically solve this problem. A particularly bad foaming situation is created when a toxic material is added to an alkaline, aqueous protein plywood adhesive to protect said adhesive from microbial decomposition.

Toxic materials which give rise to foaming in alkaline aqueous protein adhesives are pentachlorophenol, 2,3,4,6 tetrachlorophenol, 2,4,5 trichlorophenol, o-phenylphenol, 2 chloro-4 phenylphenol, 4-chloro-2 phenylphenol, 6 chloro-2 phenyl-phenol, o-cresol, p-cresol, mixed isomeric xylenols, and mixtures thereof. All of these materials may be used alone or in mixtures to increase the resistance of a protein adhesive to microbial decomposition. Technical grade materials containing more or less by-product impurities of manufacture are frequently used. The toxic phenolic materials may be added either as the free phenolic body or as the water soluble salt obtained by treating the phenolic body with sodium hydroxide, potassium hydroxide, or the like.

This invention has a primary object improvements in defoamer materials and improvements in the art of foam abatement in the types of solutions, dispersions and colloidal suspensions above indicated. The term "solutions" in this regard in the specification and the following claims is used to define and include such solutions, dispersions and colloidal suspensions.

It is a further object of the present invention to provide improved defoamer materials for solutions of the character indicated, wherein the defoamer materials consist essentially of a polymeric alkelene-oxide, also called polyglycol, soluble in ethylene glycol only to the extent of not over 10 parts of polymer to 90 parts of ethylene glycol, and sufficiently oil soluble to be dissolved in commercially employed defoamer material solvents. In the context of the present invention, by the term "substantially insoluble in ethylene glycol" is meant a polymer which is soluble to the extent of not over 10 parts of polymer to 90 parts of ethylene glycol at 70° F., and by the term "oil soluble" is meant a polymer which is soluble in a petroleum oil solvent (Shell TS–28 solvent) to the extent of at least about 1% by weight. Shell TS–28 solvent has been selected as a typical petroleum oil solvent since it is commonly used in the art as the spreader or vehicle for defoamers. Said TS–28 solvent is characterized by high solvent activity and identifiable as an aromatic concentrate containing about 65% aromatics, having a kauri butanol value of 72.5, having a boiling point range of 320°–402° F., having a weight per gallon at 60/60° F. of 7.14 lbs., and having solvent properties comparable to those of mineral spirits.

Polyglycols characterizing the present invention are consistent with the above solubility considerations and are homopolymers of alkylene-oxides having at least three carbon atoms, copolymers of alkylene-oxides, and mixtures thereof, wherein the polymer has an average molecular weight of at least about 500. Keeping in mind the indicated average molecular weight requirement, specific homopolymers as above contemplated include polypropylene glycol and poly-iso-butylene glycol, and specific copolymers include hetero and block polymers of ethylene-oxide and propylene-oxide and hetero and block polymers of ethylene-oxide and iso-butylene oxide.

Apparently the forces which govern solvation and solubility in ethylene glycol are related to the forces effecting interfacial absorption and defoaming action in alkaline aqueous adhesive solutions and the like. There appears to be no upper limit to the molecular weight of the useful polymeric alkaline oxides, although in general the higher the molecular weight the more difficult is the preparation, as a practical matter. All available samples tested of ethylene glycol insoluble polymeric alkylene-oxides prepared, including those up to an average molecular weight of approximately 5000, have been found satisfactory. Since, however, the polymers of alkylene-oxides progress in consistency from viscous liquids to plastic solids, it is theoretically conceivable that some of the very high molecular weights would not have sufficient solubility in some commercially used solvent vehicles to satisfy the indicated oil solubility consideration for practical use. Accordingly, to provide a practical upper limit as to average molecular weight of the polymeric alkylene-oxides contemplated by the present invention, an average molecular weight of about 5000 has been assigned.

An ethylene glycol insoluble alkylene-oxide polymer which is useful in oil solution as a dust reducing agent for glue powders and as a defoaming agent for aqueous alkaline protein solutions must, as has been indicated, be one which is soluble in a petroleum oil solvent such as Shell TS–28 solvent to the extent of at least 1% by weight. In practice the ethylene glycol insoluble alkylene oxide polymers are extremely effective and small amounts of the order of 0.5 part per 1000 parts of solution to be defoamed is usually satisfactory. It is not necessary that the polymers of alkylene oxides have a high degree of solubility in oil. Since the polymers of alkylene oxides are effective defoamers at low concentrations many commercially defoaming solutions of polymers in oil are useful where the concentration may be as low as 1% by weight. Usually a 5% solution is most effectively sprayed and gives adequate surface coverage. Solutions containing a minimum of oil where the oil and polymer are present in approximately equal quantity have been used. Because they are so highly effective they may be advantageously diluted with inexpensive hydrocarbon solvents such as General Petroleum Solvent No. 10, Shell Solvent TS-28, stove oil, diesel oil, fuel oil, hexane, carbon tetrachloride, methanol, isopropanol, petroleum, and the like. Usually solvents of low volatility are used. However for some purposes it may be desirable to use a solvent considerably more volatile than the polyalkylene glycol so that the solvent will evaporate before the ultimate use of the adhesive mixture.

General Petroleum Solvent No. 10 is a predominantly aromatic hydrocarbon solvent having an initial boiling point of 340° F., a final boiling point of 688° F., a kauri butanol value of 76, a flash point Penske-Martin closed cup of 210° F., and an A.P.I. gravity of 14.6.

These polymeric defoamer materials may advantageously be dissolved for ease of handling in a solvent having a high solubility for the polymeric material to give a defoamer concentrate. Such a defoamer concentrate may be shipped to a consumer's plant and then cold cut with additional solvent, thus saving freight costs. Such additional solvent may be identical with the original solvent or more likely may be a less expensive solvent of the hydrocarbon type.

The defoamer compositions may be used in a number of different ways. For example, a very convenient method to achieve adequate distribution of the defoamer composition through an adhesive dry mixture is to spray the required amount of defoamer material into the dry adhesive powder, while the adhesive powder is agitated in a suitable dry mixer, such as a double action helical ribbon mixer. In somewhat similar fashion an oil or volatile solvent solution of defoamer may be sprayed continuously into a soybean flour or an adhesive dry mixture as the flour or mixture moves continuously along a helical conveyor or similar continuous conveyor. Such a method is particularly well adapted to adding defoamer in a volatile solvent such as carbon tetrachloride or isopropanol to soybean flour during the flour milling process where the flour is conveyed continuously from point to point.

Another convenient method is to make a substantially dry mixture of the soybean flour containing from 10 to 20% of the defoamer material such that the individual particles of the mixture appear to be thoroughly wetted or coated with the defoamer composition. Such a mixture has a well-oiled appearance and yet does not have so much oil and defoamer present that the oil solution would form a separate liquid phase on standing. Such a mixture may then be dry blended in one or more steps with additional untreated soybean flour or adhesive mixture without lump formation until the desired lower concentration of defoamer material is achieved and the defoamer material is distributed throughout the mass of adhesive material.

In the following examples, except where otherwise indicated, the alkaline proteinaceous adhesive test solution was prepared and the effect of the various anti-foaming compounds or compositions thereon was determined in the following manner. 400 grams of soybean flour was mixed with 1,000 grams water at 70° F., and 18 grams of the indicated defoamer composition were mixed therewith in a mechanical mixer for three minutes. The proprietary product termed "Soytex" is a finely ground extracted soybean flour, having a protein content of about 44% and a moisture content of about 8-10%. At the end of this mixing period the resulting mixture was free from lumps. 40 parts of calcium hydroxide were suspended in 230 parts of water was added to the previous mix and mixed thoroughly with continuous mechanical agitation for three minutes. 44 cc. of a 50% sodium hydroxide (NaOH) solution were added and thoroughly mixed for one minute. 100 grams of sodium silicate were added and mixed one minute. 6 cc. of a liquid mixture containing 75% carbon bisulfite and 25% tetrachloride by weight were added and mixed two minutes. The resulting alkaline proteinaceous adhesive solution was then removed from the mixer and stored, and is essentially in the form used in the manufacture of plywood.

During the experiments to test the relative efficiency of various anti-foaming compositions for foam abatement, a laboratory foam machine closely simulating actual production conditions was utilized. The foam machine employed consisted of a steel roll 8.5 inches in diameter and 6.5 inches long rotated at 144 r.p.m. in an attached wedge shaped hopper. The total capacity of the hopper was 1200 cc. and approximately 880 cc. of glue solution was charged in the hopper in each instance of experimental test. The gap or slit where the hopper and the roll almost come in contact was .030 inch wide. The action of the rotating roll in this foam testing machine is such as to drag glue through the gap or slit and around into the upper part of the hopper, thus causing the glue in the hopper to entrain air as it rolls in contact with the revolving roll. Thus, the machine accurately tested the glue compositions as to their foaming tendency under production conditions, since a closely similar hopper feeding mechanism and steel roll driven at substantially the same speed are employed in production in the spreading of glue during the manufacture of a laminated product such as plywood.

As an accurate measure of the foaming tendency of a given solution, it is to be considered that the specific gravity of the solution provides an accurate measure of such foaming tendency, or more accurately the degree of air entrainment in the composition. A normal glue solution will usually have a specific gravity at 70° F. of between 1.00 and 1.15 when freshly mixed. After a given glue solution was subjected to the foaming action for extended periods, the specific gravity was measured and the difference in specific gravity between the initial and foamed glue provided an accurate measure of the foaming tendency of the glue. Such specific gravity measurements were taken in the following examples after 10, after 20, and after 30 minutes of foam machine treatment.

In the following examples the proportionate parts of ingredients are somewhat approximate and have been collated to two significant figures from the experimental data.

By way of furnishing preliminary data for later comparison with compositions according to the present invention, a soybean glue solution prepared according to the above procedure without addition of any anti-foaming composition showed a specific gravity after initial mixing of 1.00, and after 10 minutes on the foam machine a specific gravity of 0.49. Extending the time of the foaming action to 20 minutes further decreased the specific gravity to 0.46, and after 30 minutes treatment the specific gravity was 0.45, in the instance where no anti-foaming composition was added. In general, it has been found that where the specific gravity after 30 minutes of foam test is less than 0.85 the glue is unsatisfactory for application on commercial glue spreaders and gives rise to excessive foam development.

In order to compare the relative effectiveness of my various defoamer compositions, I have compared them primarily as to their ability to defoam soybean glue. Other glues such as blood glue or casein glue would serve as well for comparative purpose. As will be readily understood by those skilled in the art, the following examples are merely illustrative of certain specific embodiments of the invention and are not to be construed as limiting the scope thereof.

*Example I*

A liquid defoamer composition was made by dissolving together 7.5 grams of a polypropylene glycol prepared by the polymerization of propylene oxide and having an average molecular weight of 1200, and 36.8 grams of diesel oil. The polypropylene glycol was completely miscible in the diesel oil. The surface tension of water against air when the water is saturated with the defoamer composition was 37.7 dynes/sq. cm. at 70° F. The polypropylene glycol was further characterized as being a viscous oil which is completely miscible in all proportions in Shell TS-28 solvent and in mineral spirits, insoluble in a 6% sodium carbonate solution, and soluble to the extent of only 0.1% by weight in ethylene glycol.

An 880 gram sample of soybean glue, prepared as specified above, was run in the laboratory foam machine and showed a specific gravity after initial mixing of 1.04. After 10 minutes in the foam machine it had a specific gravity of 1.00 and after 30 minutes on the foam machine it had a specific gravity of 0.945.

A similar test was made mixing the adhesive as hereinbefore described except that just prior to the addition of the carbon bisulfide solution a preservative solution containing 20 grams of sodium pentachlorophenate dissolved in 120 grams of water was added to the mixture. When this glue was tested on the foam machine the specific gravity after initial mixing was 1.03 and after 30 minutes on the foam machine it had a specific gravity of 0.90. This demonstrates the effectiveness of this defoamer composition in defoaming a plywood glue containing pentachlorophenol preservative.

A similar test, made in identical fashion as to the addition of sodium pentachlorophenate but in the absence of the defoamer composition, showed a specific gravity after mixing of 0.90 and after 30 minutes on the foam machine of 0.60.

*Example II*

A liquid defoamer composition was made by dissolving together 2.5 grams of polypropylene glycol having an average molecular weight of 3000 and 36.8 grams of Shell Hexane, Code 822OF, a hydrocarbon having a kauri butanol value of 38.9 and having an initial boiling point of 149° F. and a specific gravity of 0.709 at 60/60° F.

The polypropylene glycol was completely miscible in the solvent. The surface tension of water against air when the water is saturated with the defoamer composition is 37.3 dynes per sq. cm. at 70° F. The polypropylene glycol was further characterized by being completely miscible in all proportions in benzene and in mineral spirits and only soluble to the extent of 0.5% in ethylene glycol at 70° F.

This defoamer composition was tested exactly as in the first instance set forth in Example I. The specific gravity of the glue at the end of the mixing period was 1.03. After 30 minutes on the foam machine the specific gravity of the glue was 0.96.

*Example III*

A liquid defoamer composition was made by dissolving 2.5 grams of an ethylene-oxide propylene-oxide block copolymer containing 20% ethylene-oxide and having an average molecular weight of 1600 together with 36.8 grams of Shell Solvent TS-28. The mixed alkylene-oxide copolymer was completely soluble in the solvent. The surface tension of water against air when the water is saturated with the defoamer composition is 29 dynes per sq. cm. at 70° F. The polymer was further characterized by being soluble to the extent of 10% by weight in benzene, only 5% by weight in ethylene glycol, and miscible in all proportions in water.

This defoamer composition was tested exactly as in the first instance set forth in Example I. The specific gravity of the glue at the end of the mixing period was 1.035. After 30 minutes on the foam machine the specific gravity of the glue was 0.935.

A similar glue was also prepared except that 20 grams of sodium pentachlorophenate dissolved in 120 grams of water were added prior to the addition of the carbon bisulfide solution. The resulting glue had a specific gravity of 1.02 and after 30 minutes on the foam machine it had a specific gravity of 0.85. This should be contrasted with a specific gravity of 0.60 obtained after 30 minutes on the foam machine for similar adhesive containing no defoamer, as set forth in Example I.

*Example IV*

A liquid defoamer composition was made by dissolving together 2.5 grams of an ethylene oxide-butylene oxide random copolymer containing 30% ethylene-oxide and having an average molecular weight of 2000, and 36.8 grams of toluene.

The mixed alkylene-oxide copolymer was completely soluble in the toluene. The surface tension of water against air when the water is saturated with the defoamer composition is 32 dynes per sq. cm. at 70° F. The polymer was further characterized by being soluble to the extent of 14% by weight in benzene and 0.1% by weight in ethylene glycol.

This defoamer composition was tested exactly as in the first instance set forth in Example I. The specific gravity of the glue at the end of the mixing period was 1.04. After 30 minutes on the foam machine the specific gravity of the glue was 0.90.

*Example V*

A defoamer composition was made by dissolving together 2.5 grams of an iso-butylene-oxide polymer having an average molecular weight of 600, and 36.8 grams of diesel oil. The polymer of iso-butylene-oxide, which may be also called a polybutylene glycol, was completely soluble in the quantity used in the diesel oil. The surface tension of water against air when the water is saturated with the defoamer composition is 35 dynes per sq. cm. at 70° F. The butylene-oxide polymer was further characterized by being soluble to the extent of 18% by weight in the diesel oil and only 0.05% by weight in ethylene glycol.

This defoamer composition was tested exactly as in the first instance set forth in Example I. The specific gravity of the glue at the end of the mixing period was 1.08. After 30 minutes on the foam machine the specific gravity of the glue was 0.96. This example demonstrates the excellent foam depressing property of an oil solution of a polybutylene glycol.

A similar glue was also prepared except that 20 grams of sodium tetrachlorophenate dissolved in 120 grams of water were added prior to the addition of the carbon bisulfide solution. The resulting plywood glue had a specific gravity of 1.05 and after 30 minutes on the foam machine, had a specific gravity of 0.91.

*Example VI*

In many applications where my defoamer compositions are useful the colloidal adhesive solution is spread by means of a rubber roll glue spreader. The common defoamers such as steam distilled pine oil or tri-butyl phosphate heretofore used are notoriously bad in swelling natural rubber. In the plywood industry, for example, glue spreaders now practically all use polychloroprene rubber to try and overcome this problem of the swelling of the rolls.

Unfortunately polychloroprene rubber is still swollen by defoamer materials such as pine oil and the like. Of particular interest is the fact that the polyalkylene glycols of the present invention do not swell polychloroprene rubber and defoamers compounded from them show less swelling of glue spreader than do defoamers heretofore used. This is an important advantage since once a set of rubber covered rolls is swollen the only remedy is to strip off the swollen rubber and replace with new rubber. This is an expensive operation costing about $300 for a pair of rolls 10″ in diameter and 6 feet long such as are standard in the Douglas fir plywood industry. It is thus seen that important economic advantage is obtained by using my defoamer.

A comparison was made of the swelling of polychloroprene rubber strips 5 cm. long and 0.3 cm. by 0.3 cm. in cross-section after immersion in various liquids for up to 7 days at 70° F. including the polyalkylene glycols of the various examples. The percent elongation of the rubber specimen is reported.

| Liquid | Percent elongation | |
|---|---|---|
| | 1 day immersion | 7 days immersion |
| Pine Oil | 12 | 24 |
| Tri-butyl phosphate | 10 | 20 |
| Ex. I, polyglycol | 0 | 0 |
| Ex. II, polyglycol | 0 | 0 |
| Ex. III, polyglycol | 0 | 0 |
| Ex. IV, polyglycol | 0 | 0 |
| Ex. V, polyglycol | 0 | 0 |

In all cases where a polyglycol is dissolved in some solvent and this solution is ttested for its ability to swell polychloroprene rubber, it has been found that the swelling due to the defoamer composition is to no more than the swelling due to the solvent alone.

*Example VII*

A defoamer composition was made by dissolving together 2.5 grams of polypropylene glycol having an average molecular weight of 750 and soluble to the extent of slightly less than 10% in ethylene glycol, and 36.8 grams of diesel oil. This defoamer composition was tested exactly as in the first instance as set forth in Example I. The specific gravity of the glue at the end of the mixing period was 1.03, and after 30 minutes on the foam machine showed a specific gravity of 0.87.

For comparison purposes, a test composition made up of 2.5 grams of a polypropylene glycol having a molecular weight of about 400, and which was soluble in ethylene glycol in all proportions, was dissolved in 36.8 grams of diesel oil and tested in the same manner (18 grams of solution in 400 grams of soybean flour as in Example I), with the following results. The initial specific gravity after mixing was measured as 0.975, and after 30 minutes on the foam machine, as 0.405. This latter comparison composition effectively demonstrates the inoperability of a polypropylene glycol which is soluble in ethylene glycol, insofar as the purposes and characteristics of the present invention are concerned.

*Example VIII*

A defoamer composition was made by dissolving together 2.5 grams of a copolymer of ethylene-oxide and propylene-oxide, in which the ethylene-oxide content was about 10%, which copolymer was insoluble in ethylene glycol, said copolymer being dissolved in 36.8 grams diesel oil. Testing this defoamer composition also exactly as in the first instance set forth in Example I, the initial specific gravity at the end of the mixing period was 1.02, and after 30 minutes on the foam machine the specific gravity was 0.86.

For comparison purposes, a defoamer composition comparable to the defoamer composition previously presented in this example but made from a copolymer of ethylene-oxide and propylene-oxide having an average molecular weight of 400, showed that the polyglycol was soluble in ethylene glycol to the extent of slightly more than 10% and that, while the initial specific gravity after mixing with soybean glue in the manner presented in Example I was 1.00, the specific gravity of the glue after 30 minutes on the foam machine was 0.73.

This example again demonstrates that a copolymer of ethylene-oxide and propylene-oxide, having a sufficiently high molecular weight and having a sufficiently low solubility in ethylene glycol, has the efficacy characteristic of the present invention as a defoamer in a protein aqueous adhesive, and that if the indicated molecular weight and solubility characteristics are deviated from, then the composition becomes comparatively ineffective as such a defoamer.

*Example IX*

In order to demonstrate the applicability of the defoamer composition to alkaline adhesive solutions of the resin type, the following example is presented.

Forasite SW-1920, an aqueous alkaline phenol formaldehyde resin containing about 41% resin solids was selected, as such is commonly used in the manufacture of hardboard. 9 grams of Forasite was mixed with 291 grams water, giving a 3% resin solution, and 12 ml. of 4% $H_2SO_4$ was added, resulting in the solution having a pH of 8. 30 cc. of such resin solution was placed in a 100 ml. glass graduate, stoppered, and shaken vigorously by hand for twenty strokes, after which the solution was found to have a volume of 85 ml., signifying the presence of 55 ml. of entrapped air immediately after shaking. To a similar resin solution (30 ml.) there was added one drop (1/60 cc.) of an oil solution of Polyglycol B-500, a polybutylene glycol of average molecular weight of 500, such solution consisting of 2.5 grams of the polybutylene glycol in 36.8 grams diesel oil. The resin solution, with the defoamer composition added, was shaken as before, and the resulting solution had a volume of 45 ml., signifying the presence of 15 ml. of entrapped air immediately after shaking. This mode of testing is directly comparable to commercial utilization practices for this type of glue solution because resin adhesives as employed in the hardboard and like fields are highly diluted and normally delivered as a continuous process (presenting a continuous agitation problem), while plywood practice where use of soybean and like proteinaceous adhesives is common is essentially a batch type process where the adhesive often must stand on the applicator rolls for extended periods.

*Example X*

To demonstrate the applicability of the present invention to a predominately starch type adhesive, and to also provide a further example of utilization of the defoamer composition of the present invention is a starchy, resin-containing adhesive solution, the following example is presented.

200 grams of wheat flour containing about 68% starch and about 10% protein, was mixed with a total of 1800 grams water, 40 grams of 50% caustic soda solution, and 20 grams of the Forasite resin referred to in Example IX. The composition mixture was prepared by slurrying the wheat flour in about 1500 grams water, then slowly adding the caustic soda solution and the balance of the water while stirring over a period of about two minutes, then adding the Forasite brand resin with stirring for an additional two minutes.

The foregoing adhesive composition was selected because it is a type of adhesive composition that is a more practical commercial example than starch alone, and is nevertheless predominately starchy since the amount of resin in the composition approximates seven times the amount of resin.

Testing this starch-resin adhesive solution, an initial specific gravity after mixing of 0.925 was revealed. After 30 minutes on the foam machine, the specific gravity was 0.485.

Using the starch-resin composition delineated above, and adding thereto 9 cc. of the defoamer composition (2.5 grams Polyglycol B–500 in 36.8 grams diesel oil) used in Example IX, the defoamed adhesive solution demonstrated a specific gravity after 30 minutes on the foam machine of 0.860.

*Example XI*

To demonstrate the non-applicability of polyethylene glycols for purposes of the present invention, a test solution of 2.5 grams of polyethylene glycol having an average molecular weight of 660 was dissolved in 36.8 grams of diesel oil. This polyglycol was miscible in ethylene glycol in all proportions. This test solution was tested exactly as set forth in the first instance in Example I (18 grams of test solution in a soybean adhesive solution containing 400 grams of soybean flour) with the result that, after an initial specific gravity of 0.99, the adhesive showed a specific gravity of 0.645 on the foam machine.

In a similar test solution, compounded and tested as above but utilizing a polyethylene glycol having an average molecular weight of 3520, an initial specific gravity of 1.015 was obtained, and a specific gravity of 0.765 after 30 minutes on the foam machine was revealed.

The tests of this example demonstrate that polyethylene glycols are not utilizable for purposes of the present invention, regardless of their average molecular weight.

*Example XII*

In order to show the non-applicability and comparative ineffectiveness of polyethylene glycol esters, a test solution of 2.5 grams polyethylene glycol monostearate having an average molecular weight of 400 as to the polyethylene glycol portion was mixed with 36.8 grams diesel oil and was tested exactly in the same way as set forth in the first instance in Example I.

This test adhesive solution displayed an initial specific gravity after mixing of 1.045, after 10 minutes on the foam machine a specific gravity of 0.85, after 20 minutes on the foam machine a specific gravity of 0.775, and after 30 minutes on the foam machine a specific gravity of 0.765.

One advantage of my invention is that the solutions of polyalkylene glycols in oil are easily sprayed into fine ground adhesive materials such as soybean flour, soluble blood, peanut flour, starch and the like, whereby the surfaces of individual adhesive material particles are wetted or oiled sufficiently to greatly reduce dusting of the adhesive materials during bulk handling such as occurs during bagging dry adhesives prior to shipment to the customer and again when used by the customer. There is a definite improvement in the de-dusting effect of the alkylene oxide-polymer oil solutions over oil alone. This is probably due to the ability of the polyglycol to retard the development of static electricity charges on the adhesive material particles. Usually from 1 to 5% of defoamer based on adhesive material is adequate to reduce dusting and provide foam control.

In using the above-indicated polymers and copolymers of alkylene-oxides it will be readily understood that they may be used singly or in combination with each other and/or with other compatible defoaming agents.

Due to the polymeric nature of my new defoamer compositions they are substantially less volatile than commonly used defoamers such as alpha-terpineol or steam distilled pine oil.

Dry adhesive mixes which contain alkylene-oxide oil solutions do not appreciably change in foaming properties when stored for long periods of time over one year at ordinary room temperatures. This is to be contrasted with the behavior of dry adhesive mixes containing steam distilled pine oil as a defoaming agent which mixes deteriorate markedly on dry storage as occurs when bags of dry adhesive mixes are stored in a glue loft prior to use in a plywood mill for example.

In view of the foregoing considerations and examples, as well as such features and advantages as are inherent from the disclosed nature and characteristics of the present invention, various other compositions, formulations and applications within the scope thereof will occur to those skilled in the art, consistent with the spirit and scope of the invention, as defined by the following claims.

This application is a continuation-in-part of my copending application Serial No. 585,965, entitled "Polymeric Alkylene-Oxide Defoamer Material," filed May 21, 1956, now abandoned.

What is claimed is:

1. A dry, proteinaceous adhesive mix containing not over about 5% by weight of a defoamer material comprising a polyglycol selected from the group consisting of homopolymers of alkylene-oxides having at least three carbon atoms, copolymers of alkylene-oxides, and mixtures thereof, said polyglycol being soluble in ethylene glycol only to the extent of not over 10 parts of polyglycol to 90 parts of ethylene glycol, and being present in an amount effective to render said dry adhesive mix substantially non-dusting.

2. A dry, proteinaceous adhesive mix containing not over about 5% by weight of a defoamer material consisting essentially of an oil solution of a polyglycol selected from the group consisting of homopolymers of alkylene-oxides having at least three carbon atoms, copolymers of alkylene-oxides, and mixtures thereof, said polyglycol being soluble in ethylene glycol only to the extent of not over 10 parts of polyglycol to 90 parts of ethylene glycol, and being present in an amount effective to render said dry adhesive mix substantially non-dusting.

3. A dry, proteinaceous adhesive material containing not over about 5% by weight of a polyglycol selected from the group consisting of homopolymers of alkylene-oxides having at least three carbon atoms, copolymers of alkylene-oxides, and mixtures thereof, said polyglycol being soluble in ethylene glycol to the extent of not over 10% by weight and having an average molecular weight of at least about 500, said polyglycol being present in an amount effective to render said material substantially non-dusting and said adhesive material thereby being in a form suitable for admixture in the field with aqueous adhesive solution forming materials, the said polyglycol at such time also functioning to inhibit formation of foam in the solution when agitated.

4. Solvent extracted ground soybean material in dry form, containing not over about 5% by weight of a polyglycol selected from the group consisting of homopolymers of alkylene-oxides having at least three carbon atoms, copolymers of alkylene-oxides, and mixtures thereof, said polyglycol being soluble in ethylene glycol to the extent of not over 10% by weight and having an average molecular weight of at least about 500, said polyglycol being present in an amount effective to render said material substantially non-dusting and said adhesive material thereby being in a form suitable for admixture in the field with aqueous adhesive solution forming materials, the said polyglycol at such time also functioning to inhibit formation of foam in the solution when agitated.

5. Ground soybean material according to claim 3, further containing an effective amount of a polychlorophenate, serving as a preservative.

6. The process of preparing the solvent extracted ground soybean material specified in claim 4, wherein the said polyglycol is intimately admixed with the soybean material by spraying.

7. The process of preparing the ground soybean material specified in claim 4, comprising mixing a sufficient quantity of the polyglycol with the soybean material to substantially wet all of the individual soybean material particles in a pre-mix, and continuing additions of soybean material and mixing until the polyglycol is distributed substantially uniformly throughout the mass of the soybean material.

8. A proteinaceous, aqueous adhesive solution containing a foam inhibiting amount of an oil solution of a polyglycol soluble in ethylene glycol only to the extent of not over 10 parts of polyglycol to 90 parts of ethylene glycol, which polyglycol is selected from the group consisting of homopolymers of alkylene-oxides having at lease three carbon atoms, copolymers of at least two different alkylene-oxides, and mixtures of such polymers, the said polyglycol having an average molecular weight of at least about 500.

9. In a proteinaceous, aqueous adhesive solution a defoamer comprising an oil solution of a polyglycol soluble in ethylene glycol only to the extent of not over 10 parts of polyglycol to 90 parts of ethylene glycol, and selected from the group consisting of homopolymers of alkylene-oxides having at least three carbon atoms, alkylene-oxides, and mixtures of such polymers, wherein the polyglycol has an average molecular weight of at least about 500.

10. A proteinaceous, alkaline aqueous adhesive solution having incorporated therewith a defoamer comprising an oil solution of a polyglycol having an average molecular weight of from about 500 to about 5000 and soluble to the extent of not more than 10 parts of polymer to 90 parts of ethylene glycol, the said polyglycol being selected from the group consisting of homopolymers of alkylene-oxides having at least three carbon atoms, copolymers of alkylene-oxides, and mixtures thereof.

11. A proteinaceous, aqueous adhesive solution having incorporated therewith a defoamer material consisting essentially of a polyglycol selected from the group consisting of homopolymers of alkylene-oxides having at least three carbon atoms, copolymers of alkylene-oxides, and mixtures thereof, said polyglycol being soluble in ethylene glycol only to the extent of not over 10 parts of polyglycol to 90 parts of ethylene glycol, and having an average molecular weight of at least about 500.

12. A proteinaceous alkaline aqueous adhesive composition comprising a foam inhibitor consisting essentially of an oil solution of a polyglycol having an average molecular weight of from about 500 to about 5000 and soluble to the extent of not more than 10 parts of polymer to 90 parts of ethylene glycol, the said polyglycol being selected from the group consisting of homopolymers of alkylene-oxides having at least three carbon atoms, copolymers of alkylene-oxides, and mixtures thereof.

13. A defoamed, proteinaceous aqueous adhesive solution having a defoaming agent consisting essentially of an oil solution of a polyglycol having an average molecular weight of at least about 500 and soluble to the extent of not more than 10 parts of polymer to 90 parts of ethylene glycol, the said polyglycol being selected from the group consisting of homopolymers of propylene glycol and iso-butylene glycol, copolymers of ethylene-oxide and propylene-oxide, copolymers of ethylene-oxide and iso-butylene oxide, and mixtures thereof.

14. A defoamed, proteinaceous aqueous adhesive composition of the character indicated, comprising an oil soluble polyglycol soluble in ethylene glycol only to the extent of not over 10 parts of polyglycol to 90 parts of ethylene glycol and having the capability of imparting a surface tension of less than 38 dynes per sq. cm. to a water solution saturated at 70° F., which polyglycol is selected from the group consisting of homopolymers of alkylene-oxides having at least three carbon atoms, copolymers of alkylene-oxides, and mixtures thereof, said polyglycol being substantially insoluble in ethylene glycol and having an average molecular weight of at least about 500.

15. A proteinaceous adhesive solution of the character indicated, comprising a defoamer consisting essentially of a solution of a polyglycol in petroleum oil solvent, wherein said polyglycol is soluble in ethylene glycol to the extent of not over 10% by weight, imparts a surface tension of less than 38 dynes per sq. cm. to a water solution saturated with said polyglycol solution at 70° F. and said solution swells Neoprene rubber to an extent of not more than the swelling due to the solvent alone, the said polyglycol being selected from the group consisting of homopolymers of alkylene-oxides having at least three carbon atoms, copolymers of alkylene-oxides, and mixtures thereof, having an average molecular weight of at least about 500.

16. A proteinaceous adhesive solution containing a foam inhibiting amount of a polyglycol soluble in ethylene glycol only to the extent of not more than 10% by weight, which polyglycol is selected fom the group consisting of homopolymers of alkylene-oxides having at least three carbon atoms, copolymers of at least 2 different alkylene-oxides, and mixtures of such polymers, the said polyglycol having an average molecular weight of at least about 500.

17. An aqueous soybean adhesive solution containing a defoamer comprising a polyglycol soluble in ethylene glycol only to the extent of not more than 10% by weight, and is selected from the group consisting of homopolymers of alkylene-oxides having at least three carbon atoms, alkylene-oxides, and mixtures of such polymers, wherein the polyglycol has an average molecular weight of at least about 500.

18. A dry adhesive mix having as a primary ingredient a potentially adhesive proteinaceous material in particulate form and having dispersed through said material a defoamer composition consisting essentially of a polyglycol dissolved in a substantially water insoluble, substantially non-volatile solvent vehicle, said polyglycol having the property of being soluble in ethylene glycol only to the extent of not over 10% by weight and being selected from the group consisting of homopolymers of alkylene-oxides having at least three carbon atoms, copolymers of alkylene-oxides, and mixtures thereof, the said defoamer composition being present in said mix in an amount effective to render same substantially non-dusting and to inhibit foaming thereof when the mix is agitated in aqueous solution.

19. A proteinaceous, alkaline aqueous adhesive composition comprising an aqueous solution of a proteinaceous adhesive material having incorporated therewith a foam inhibitor consisting essentially of a polyglycol dissolved in a substantially water insoluble, substantially non-volatile solvent vehicle therefor, said polyglycol having the property of being soluble in ethylene glycol only to the extent of not over 10% by weight and being selected from the group consisting of homopolymers of alkylene-oxides having at least three carbon atoms, copolymers of alkylene-oxides, and mixtures thereof, the said foam inhibitor being present in said adhesive composition in an amount effective to inhibit foaming thereof when agitated.

References Cited in the file of this patent
UNITED STATES PATENTS

| | | |
|---|---|---|
| 2,390,212 | Fritz | Dec. 4, 1945 |
| 2,548,646 | Bicknell | Apr. 10, 1951 |
| 2,782,162 | Liddell | Feb. 19, 1957 |
| 2,805,169 | Mitchell | Sept. 3, 1957 |

OTHER REFERENCES

"Pluronics," Wyandotte Chemical Corp. (1954), pp. 4 and 8.